Dec. 30, 1952 H. J. VON BAEYER 2,623,994

RECEIVER FOR TIME MODULATED PULSES

Filed Feb. 10, 1948

Inventor:
Hans Jakob von Baeyer,

By Pierce, Scheffler & Parker,
Attorneys.

Patented Dec. 30, 1952 2,623,994

UNITED STATES PATENT OFFICE 2,623,994

RECEIVER FOR TIME MODULATED PULSES

Hans Jakob von Baeyer, Baden, Switzerland, assignor to "Patelhold" Patentverwertungs- & Elektro-Holding A.-G., Glarus, Switzerland, a joint-stock company Application February 10, 1948, Serial No. 7,509
In Switzerland February 17, 1947

1 Claim. (Cl. 250—20)

Figure 1:
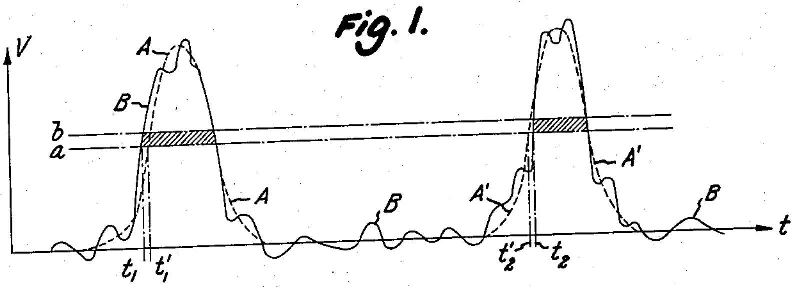

This invention relates to ultrashort wave receivers for time modulated pulses, and more particularly to receivers having a high signal-to-noise ratio.

In the communication of intelligence by time modulated pulses, it is known that a considerable reduction of background noise may be obtained by suppressing the rectified pulses below a certain threshold voltage and clipping the rectified pulse above an upper limit, and converting the resulting phase or width modulation to low frequency signals. Noise voltages of less than the selected threshold value are completely suppressed and, in general, no audio signals are developed during intervals between pulses. If the threshold is set at approximately one-half the peak pulse voltage, noise voltage components initiated before the pulse voltage reaches the threshold value can result only in distortion of the audio signal by variation of the time at which the pulse voltage exceeds the threshold value.

According to the prior proposals, the time modulated pulses of carrier frequency energy were amplified at high frequency, rectified to develop direct current pulses, and the rectified pulses were then amplified to develop voltage pulses of adequate magnitude to subject to clipping below a threshold value and above a limiting value. Extremely high carrier frequencies are required when the time modulated pulses are developed by a very wide signal frequency band, and this leads to difficulties in the high frequency amplification and also reduces the efficiency of rectification. The amplification obtained in the high frequency portion of the receiver has been offset to a considerable extent in the rectifier, and it therefore was necessary to resort to amplification of the rectified pulses to obtain peak voltages in excess of, and for example about twice the value of, the desired threshold voltage. This amplification of the rectified pulses was particularly objectionable in the case of multiplex communication systems in view of the tendency toward cross-talk owing to the wide frequency range of the pulses.

An object of the invention is to eliminate or reduce to the greatest possible extent the disadvantages inherent in the known receivers of the time modulated pulse type and to this end, according to the invention, the pulses amplified in the high frequency portion of the receiver are rectified in a circuit which is inoperative below a preselected threshold voltage, and the resulting rectified pulses are imposed, without amplification, upon a limiter or peak clipping circuit. An object is to provide a receiver for time modulated pulses which includes a rectifier circuit following a high frequency amplifier, the rectifier circuit being automatically biased to suppress rectification below a selected fraction, for example one-half, of the pulse peak voltage. Still another object is to provide, in a receiver having novel characteristics as above stated, for an automatic control of the amplification rate of the high frequency amplifier in response to the bias voltage developed in the rectifier circuit.

Figures 2, 3:
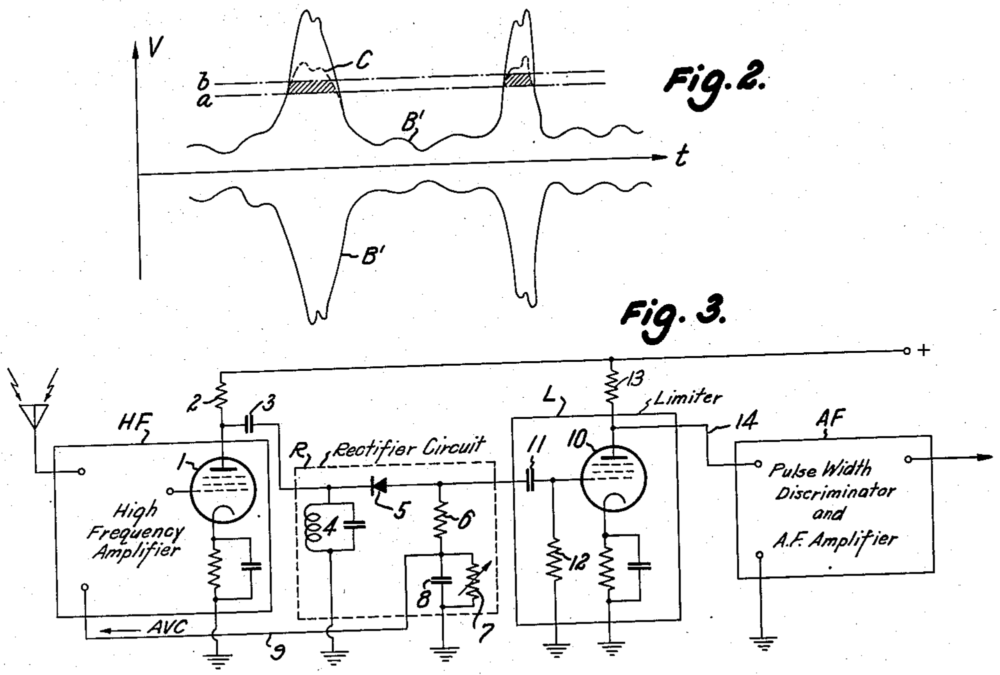
Figure 4:
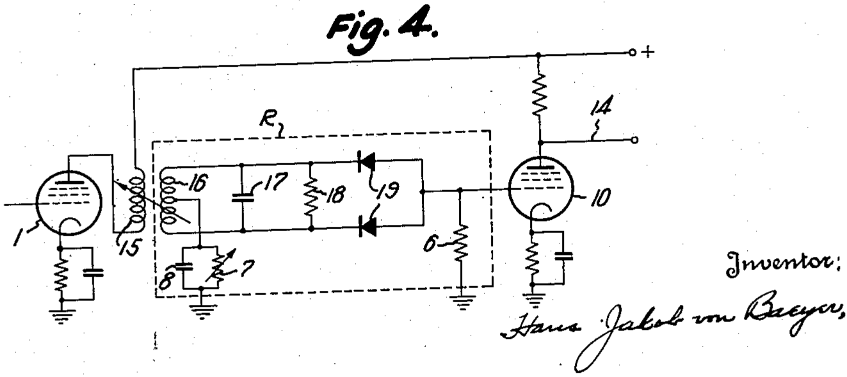

These and other objects, and the advantages of the invention, will be apparent from the following specification when taken with the accompanying drawings, in which:

Figs. 1 and 2 are curves, of voltage plotted against time, for typical pulse and noise voltage relationships, the portions of the voltage pulses which are eventually converted into signal voltage components being hatched; and Figs. 3 and 4 are fragmentary circuit diagrams of different radio receiver arrangements embodying the invention.

In Fig. 1, the broken line curves A, A′ indicate in undistorted form the voltage variation of successive pulses corresponding to different messages of a multiplex communication system, and the solid line curve B indicates the variation of the voltage of the pulses as distorted by noise components. As is well known, the width of the curves A, A′ measured along the time axis $t$ corresponds to the signal modulation of the transmitted messages. The signal-to-noise ratio is increased by limiting the transmission through the receiver to voltages above a threshold value $a$ and below a limit or clipping value $b$, as indicated by the hatched portions between peaks of the voltage curve B. Noises voltages which occur between successive signal pulses are effectively suppressed but noise voltages occurring at approximately the instants that the voltage pulses A, A′ reach the cut-off voltage values $a$, $b$ affect the timing, and therefore the width, of the effective pulses from which low frequency signals are developed. In Fig. 1, $t_1$ and $t_2$ indicate the times at which the noise-distorted voltage pulses reach the threshold value $a$, and $t_1'$ and $t_2'$ indicate the times when the undistorted voltage pulses A, A′ would reach the threshold value $a$. Therefore, and apart from noise initiated after the threshold value $a$ is reached, the noise during the pulse transmission introduces distortions dependent upon the time differences $t_1'—t_1$ and $t_2'—t_2$, and these time differences are reduced to a minimum by selecting the threshold voltage value $a$ at about half the peak voltages of pulses A, A' since the edges of the pulse voltage curves are very steep at their midpoints.

In Fig. 2, the curves B' are the envelope of an amplified signal of carrier wave or intermediate frequency which is pulsed on a time modulation basis and distorted by noise components. According to the invention, this modulated signal is subjected to a non-linear rectification which flattens off the output voltage curve C above the threshold voltage $a$ by losses in a self-biased rectifier circuit. As distinguished from the prior practice of rectifying the amplified signals and subsequently clipping below a threshold value, the amplitude loss resulting from an inefficient rectification is of no significance when rectification is delayed until the threshold voltage $a$ has been exceeded since the remaining pulse height suffices to make certain that the upper clipping voltage value $b$ is also exceeded, the value $b$ being only slightly above the threshold value $a$. The width, on the time axis $t$, of the effective pulse is substantially proportional to the modulation voltage of the transmitted communication as the effects of noise voltages are suppressed to a considerable extent.

A constructional form of receiver may comprise, as shown in Fig. 3, a high frequency amplifier HF of tuned radio frequency or superheterodyne type, a self-biased rectifier circuit comprising the circuit elements within the broken line rectangle R, a limiter L, and conventional circuit elements within the rectangle AF for converting the variable width pulses to audio frequency signals and amplifying the same. In the case of a multiplex communication system, appropriate switch means are provided for distributing the received message pulses to the individual message channels.

More specifically, the tube 1 of the output stage of the high frequency amplifier HF has a plate resistance 2 across which amplified pulses of carrier frequency or intermediate frequency energy are developed, and such voltage pulses are transmitted through a coupling condenser 3 to the oscillatory input circuit 4 of the rectifier system R. The rectifier circuit includes, in series, the input circuit 4, a rectifier 5 which may be a diode or a crystal rectifier, an output resistor 6 across which a direct current pulse is developed by an applied pulse of carrier frequency or intermediate frequency energy, and an adjustable resistance 7 shunted by a condenser 8. The rectifier circuit is biased by the charging of the condenser 8 under the influence of the received pulses, and the values of resistance 7 and condenser 8 are so selected or adjusted that the time constant of this compound impedance is high with respect to the period of the lowest modulation frequency occurring in the pulse sequence.

Adjustment of the value of the resistance 7 varies the level of the threshold $a$, Figs. 1 and 2, below which no rectification takes place and, with a constant relationship between the pulses, the threshold level may be set at any desired fraction of the pulse peak voltage. It is advantageous to adjust the resistance 7 to a threshold voltage $a$ of about one-half the pulse voltage peak since the sides of the voltage curves of the pulses are steep at their midpoints and disturbing noise voltages therefore have a relatively small influence upon the width of the pulse voltage curves in this region. Small variations in the pulse peak voltage result in an automatic adjustment of the threshold level to the selected fraction of the pulse peak voltage in view of the variation of the magnitude of the current through the rectifier 5 and the consequent variaction of the charging condition of the condenser 8.

The self-bias or threshold voltage developed across the resistance 7 may advantageously be employed for the automatic control of the gain of the high frequency amplifier HF to reduce fluctuations in the peak voltages of the pulses imposed upon the rectifier circuit R. As shown in Fig. 3, the low voltage side of the input circuit 4 is grounded, and the compound impedance 7, 8 is connected between ground and the output resistor 6. The bias voltage for automatic volume control may be imposed upon the amplifier stages of the high frequency amplifier HF by a lead 9 extending from the high voltage end of the resistance 7 to the amplifier.

The direct current pulses developed across the rectifier output resistor 6 are proportional to the pulse crests C, Fig. 2, above the threshold value $a$ and, to clip these pulse crests at the upper limit $b$, the output of the rectifier circuit R is imposed with negative polarity upon the control grid of tube 10 of the limiter L, the operating conditions preferably being such that the voltage pulses are clipped at about one-fourth of the crest voltage above the threshold value $a$. Rectifier 5 is connected to the control grid of the tube 10 through a condenser 11 and the grid is returned to ground through a resistor 12. The voltage pulses developed across the output resistance 13 of the tube 10 will therefore be of constant amplitude and of variable width or time duration according to the time modulation imposed upon the pulses at the transmitter. The pulse voltages of varying width are transmitted over lead 14 to the audio frequency system AF, of known or desired construction, in which they are converted into audio frequency signals by a pulse width discriminator, and then amplified and transmitted to a reproducer or reproducers, not shown, in conventional manner.

The circuit arrangement of Fig. 3 may be modified, as described later with reference to the Fig. 4 embodiment, by transferring the bias-developing impedance 7, 8 into series arrangement between the rectifier input circuit 4 and ground, with due consideration of course to polarity conditions to maintain a selected threshold value of rectification. The capacitive coupling of the rectifier circuit R to the limiter L through condenser 11 and resistor 12 may be omitted in this modification of the Fig. 3 circuit.

A full-wave rectifier circuit, as shown in Fig. 4, is preferable to the described half-wave rectifier circuit as the variation of pulse width with noise components is thereby reduced. Elements of the Fig. 4 circuit which are, or may be, substantially identical with elements of the Fig. 3 circuit are identified by like numerals but will not be described in detail. Tube 1 of the output stage of the high frequency amplifier HF is coupled to the rectifier circuit through an adjustable transformer having a primary winding 15 in the plate circuit of tube 1 and a center-tapped secondary winding 16 which is tuned by a condenser 17 to the high frequency of the voltage output of tube 1. The center tap of winding 16 is connected to ground through the bias-developing compound impedance comprising the adjustable resistor 7 shunted by condenser 8. The oscillatory input circuit 16, 17 is damped by a resistor 18, and the ends of the winding 16 are connected through rectifiers 19 to the rectifier output resistor 6. The other end of resistor 6 is grounded, and the rectifier circuit thus conforms to the above-described modification of the Fig. 3 circuit. The high voltage end of the output resistor 6 may therefore be directly connected to the control grid of the limiter tube 10. Alternatively, the compound impedance 7, 8 may be connected between the output resistor 6 and ground, as is shown in Fig. 3. With this alternative arrangement, however, the blocking condenser 11 and grid resistor 12 must be employed.

In all embodiments of the invention, the input circuit of the rectifier or rectifiers should present a very low impedance to the pulses which exceed the threshold value $a$ and are rectified, and the coupling of this circuit to the preceding stage should be a pure carrier frequency or intermediate frequency coupling.

I claim:

An ultrashort wave receiver for intelligence transmitted as time modulated pulses of carrier frequency energy, said receiver comprising a high frequency amplifier, a full-wave rectifier circuit working out of said amplifier to develop direct current pulses from the pulsing amplifier output, a voltage limiter immediately following the rectifier circuit to limit the amplitude of the direct current pulses to a selected fraction of their crest value, and means for converting the pulse output of said voltage limiter to low frequency signals corresponding to the transmitted intelligence; said rectifier circuit comprising a center-tapped inductance coupled to the amplifier and tuned by a shunt condenser to the amplifier output frequency, an output resistor having one grounded terminal and a high potential terminal for connection to said voltage limiter, a pair of rectifiers connected respectively between the opposite ends of said inductance and the high potential terminal of said resistor, and self-biasing means comprising a condenser in shunt with a resistance and connected between the center tap of said inductance and ground, said shunt resistance being adjustable to suppress rectification of successive pulses below a threshold value equal to a preselected fraction of the pulse peak value.

HANS JAKOB VON BAEYER.

REFERENCES CITED

The following references are of record in the file of this patent:

UNITED STATES PATENTS

| Number | Name | Date |
|---|---|---|
| 2,224,794 | Montgomery | Dec. 10, 1940 |
| 2,259,520 | Freeman | Oct. 21, 1941 |
| 2,294,341 | Moore | Aug. 25, 1942 |
| 2,363,288 | Bell | Nov. 21, 1944 |
| 2,392,546 | Peterson | Jan. 8, 1946 |
| 2,416,328 | Labin | Feb. 25, 1947 |
| 2,428,011 | Chatterjea et al. | Sept. 30, 1947 |
| 2,441,969 | Lehman | May 25, 1948 |

FOREIGN PATENTS

| Number | Country | Date |
|---|---|---|
| 893,479 | France | Jan. 31, 1944 |